United States Patent [19]
Chabot et al.

[11] Patent Number: 5,438,449
[45] Date of Patent: Aug. 1, 1995

[54] BEAM POINTING SWITCH

[75] Inventors: Arthur A. Chabot, Westford; Albert V. Jelalian, Bedford; Wayne H. Keene, South Natick, all of Mass.

[73] Assignee: Raytheon Company, Lexington, Mass.

[21] Appl. No.: 125,519

[22] Filed: Nov. 25, 1987

[51] Int. Cl.[6] .................. G02B 26/08; G02B 5/122
[52] U.S. Cl. .................................. 359/216; 359/211; 359/529
[58] Field of Search .................. 350/6.1, 6.4, 6.5, 6.6, 350/6.7, 6.8, 6.9, 127, 129, 102, 171, 241, 445, 447, 6.2, 6.3, 286; 356/139, 140, 147, 153, 354, 375, 128; 250/236, 234; 359/196, 197, 210, 211, 216, 220, 529

[56] References Cited

U.S. PATENT DOCUMENTS

| | | | |
|---|---|---|---|
| 3,107,070 | 10/1963 | Willits et al. | 359/209 |
| 3,588,218 | 6/1971 | Hunt et al. | 350/6.3 |
| 3,818,444 | 6/1974 | Connell | 350/6.8 |
| 3,881,802 | 5/1975 | Helava | 350/6.4 |
| 4,326,799 | 4/1982 | Keene et al. | |
| 4,544,228 | 10/1985 | Rando | 359/211 |
| 4,795,224 | 1/1989 | Goto | 359/211 |
| 4,830,443 | 5/1989 | Hecker et al. | 359/210 |

OTHER PUBLICATIONS

Fundamentals of Optics, 3rd ed., F. A. Jenkins and H. E. White, McGraw-Hill, New York, 1957, pp. 16–17.

*Primary Examiner*—Georgia Y. Epps
*Assistant Examiner*—Michael A. Papalas
*Attorney, Agent, or Firm*—Walter F. Dawson

[57] ABSTRACT

An optical beam switch is disclosed for sequentially pointing a laser beam to a plurality of terrestrial target locations at predetermined depression angles and at angular positions relative to a reference direction. The switch includes a CW laser whose collimated output beam is directed into a rotating retroreflector. The moving beam reflected therefrom describes a continuous circular path across the upper surface of a beam deflection device. The beam deflection device comprises a plurality of beam refracting prisms. The index of refraction and angulation of each prism determines the depression angle and azimuthal angle of the deflected beam. The depression angle is held precisely constant as the incident beam describes its arcuate path across the upper surface of the prism. The retroreflector may comprise three mutually-perpendicular mirrors, joined at a vertex, for providing a reflected beam parallel to and displaced from the incident beam. Alternatively, the retroreflector may comprise a triple mirror prism.

31 Claims, 5 Drawing Sheets

BEAM POINTING SWITCH

BACKGROUND OF THE INVENTION

The present invention relates generally to laser navigation systems and, more particularly, to an electrooptical system for sequentially switching a beam of light through a plurality of discrete beam positions.

A laser navigation system known in the art includes a laser whose output beam is directed via a beam pointing system to a plurality of azimuth locations relative to the motion vector of the vehicle to provide a time multiplexed transmitter beam distribution on the ground. The propagated beams are reflected from the ground, collected through the beam pointing system, and combined with a local oscillator signal in a detector. The detected Doppler signal may be processed to obtain information relating to, inter alia, velocity, angular position and range.

The overall system accuracy depends to a large extent on the quality of the Doppler velocity line-of-sight measurements which, in turn, rely on the accuracy of the beam pointing system in relation to the azimuth of the illumination locations and (more importantly) the angles of incidence, or depression angles, of the beams with the ground surface. Although beam pointing accuracy is of great importance, the repeatability of the beam pointing is of even greater significance.

One prior art system comprises a light source, a beam expander (telescope) and an optical device for directing the light from the source onto the optical axis of the beam expander. The beam expander is directed downward and at a predetermined oblique angle with respect to the ground surface. A motor drives the beam expander such that its optical axis sweeps a conical surface, and mechanical detents cause the beam expander to periodically stop and dwell at predetermined positions along its swept path. The device for directing light into the beam expander is also rotated intermittently to maintain the light beam at the input of the beam expander. The intermittently moving parts of this system are of relatively high inertia and are therefore difficult to maintain at close tolerances.

In a second system, similar to the one described above, the beam expander is fixed in position and an optically reflecting device is intermittently rotated to sweep the beam emerging from the beam expander to a plurality of locations on the ground surface. Although this second system provides a reduction in the intermittently driven mass, it is still very susceptible to relatively wide deviations of its azimuthal and depression angles in response to very slight deviations in the drive elements.

In another beam pointing apparatus, a light source and beam expander are pointed substantially downward, and a wedge-shaped prism is intermittently rotated normal to the beam axis. See, for example, U.S. Pat. No. 4,326,799, "Active-Passive Scanning System," issued to W. H. Keene and A. V. Jelalian, on Apr. 27, 1982, and assigned to the same assignee as the present invention, for a description of a wedge-shaped prism used for beam steering. While useful in some applications, when used for intermittent scanning, the rotating wedge is susceptible to some of the same variations as the other prior art examples, resulting in wide deviations of the azimuthal and depression angles.

None of the aforementioned beam pointing apparatus is readily adaptable to providing the accuracy of Doppler velocity measurements required in many demanding navigational systems. Such systems require repeatability of measurements which can be obtained only by a beam pointing apparatus in which the azimuthal and depression angles of the ground illuminating beams deviate by no more than a few microradians. Such repeatability is virtually unattainable in an apparatus including a mechanically rotating beam pointing element. Control of the bearing runout tolerances and minimization of bearing noise to the extent necessary to prevent translation and unwanted rotation of the device would be costly and difficult to achieve and maintain.

SUMMARY OF THE INVENTION

With this background of the invention in mind, it is an object of the present invention to provide an improved beam pointing switch for use in a laser navigation system, wherein a single beam of light is used to sequentially illuminate a plurality of discrete angular positions relative to a reference at predetermined angles of incidence.

It is another object of the present invention to provide such a beam pointing switch in which the beam of light has a substantial dwell time at each of the plurality of discrete angular positions without the use of precision azimuthal indexing of the beam directing apparatus.

It is a further object of the present invention to provide such a beam pointing switch whose pointing accuracy is completely insensitive to mechanical perturbations in the light beam switching apparatus.

These and other objects of the present invention are obtained generally by providing an apparatus for sequentially illuminating a plurality of target surface locations from a light beam comprising a deflection means, including a plurality of light deflecting segments. Each of the light deflecting segments deflects the light beam toward a location on the target surface at a predetermined angle of incidence. The apparatus additionally includes means for directing the light beam sequentially to each of the plurality of light deflecting segments.

In a preferred embodiment of the present invention, the light beam directing means comprises a rotatable retroreflector responsive to the light beam from a source for providing an output light beam parallel to and laterally displaced from the input beam.

With such arrangement, the depression angles of the target illuminating beams are independent of the angles of incidence on and reflection from the rotating retroreflector. Thus, the accuracy of the beam pointing switch of the present invention is completely insensitive to rotational mechanical perturbations.

Other features and advantages of the present invention will be more fully understood from the accompanying drawings, the detailed description of the preferred embodiments, and from the appended claims.

DETAILED DESCRIPTION OF THE PREFERRED EMBODIMENT

Figure 1:
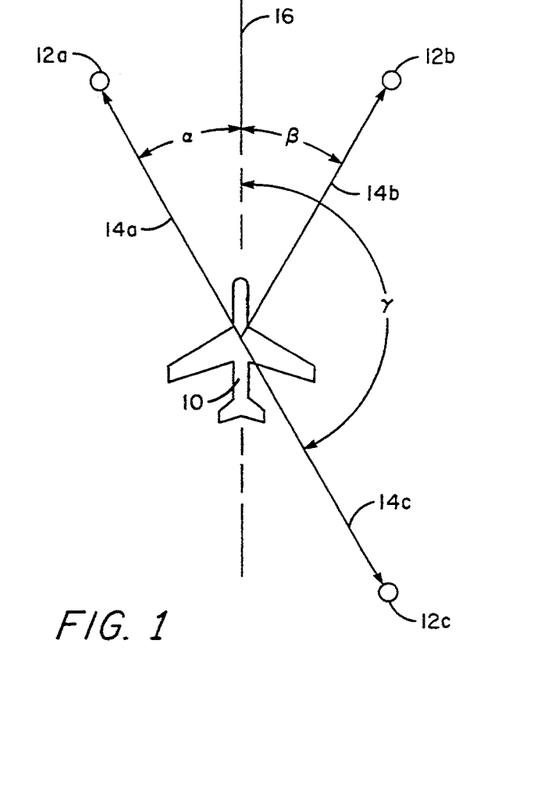
FIG. 1 illustrates an aircraft generating ground surface illuminating beams used for navigation.

Referring to FIG. 1, there is shown an aircraft 10 in flight including the positions of three terrestrial surface spots 12a, 12b and 12c, which are illuminated by light beams 14a, 14b and 14c, respectively, and which are used in the navigation of aircraft 10. Illuminated spots 12a, 12b and 12c bear predetermined angular relationships to the centerline 16 of flight direction of aircraft 10 (imaged to the ground). More particularly, in the present example, illuminated spot 12a is at an angle α to the left (counter-clockwise) from the ground image of centerline 16, and spots 12b and 12c are at angles β and γ, respectively, to the right (clockwise) from the ground image of centerline 16. Although aircraft 10 is explicitly shown as an airplane, it is understood that a similar navigational system embodying the present invention may be implemented within any form of aircraft, including a missile.

Figure 2:
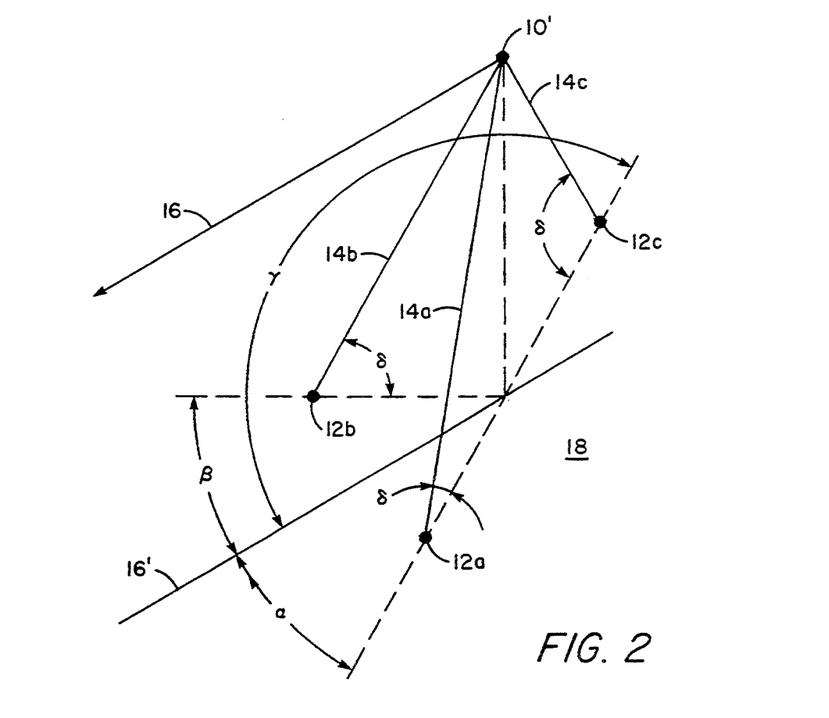
FIG. 2 is a projection depicting geometric relations among the beams for a preferred embodiment.

FIG. 2 is a more specific geometric projection depicting the illuminating beams 14a–14c emanating from a source 10', which may be part of the aircraft 10 of FIG. 1. Source 10' moves along the flight centerline indicated by arrow 16. In operation, source 10' provides, in continuous sequence, light beam 14a for illuminating spot 12a on ground surface 18, beam 14b for illuminating spot 12b on ground surface 18, and beam 14c for illuminating spot 12c on ground surface 18. Because of the movement of source 10', spots 12a–12c move along ground surface 18, but their angular positions relative to the ground image 16' of flight centerline 16 remain fixed.

In the present example, beam 14a is incident on surface 18 at an angle δ, referred to as the depression angle, and spot 12a is positioned at an angle α toward to the left (counter-clockwise) from the reference location, i.e., flight centerline image 16'. Beam 14b intersects surface 18 at depression angle δ, and spot 12b is positioned at an angle β toward the right (clockwise) from image 16'. Beam 14c intersects surface 18 at a depression angle δ and spot 12c is positioned at an angle γ clockwise from image 16'. In this example, spots 12a–12c are, sequentially scanned in a clockwise direction, i.e., 12a–12b–12c–12a–etc.

Figure 3:
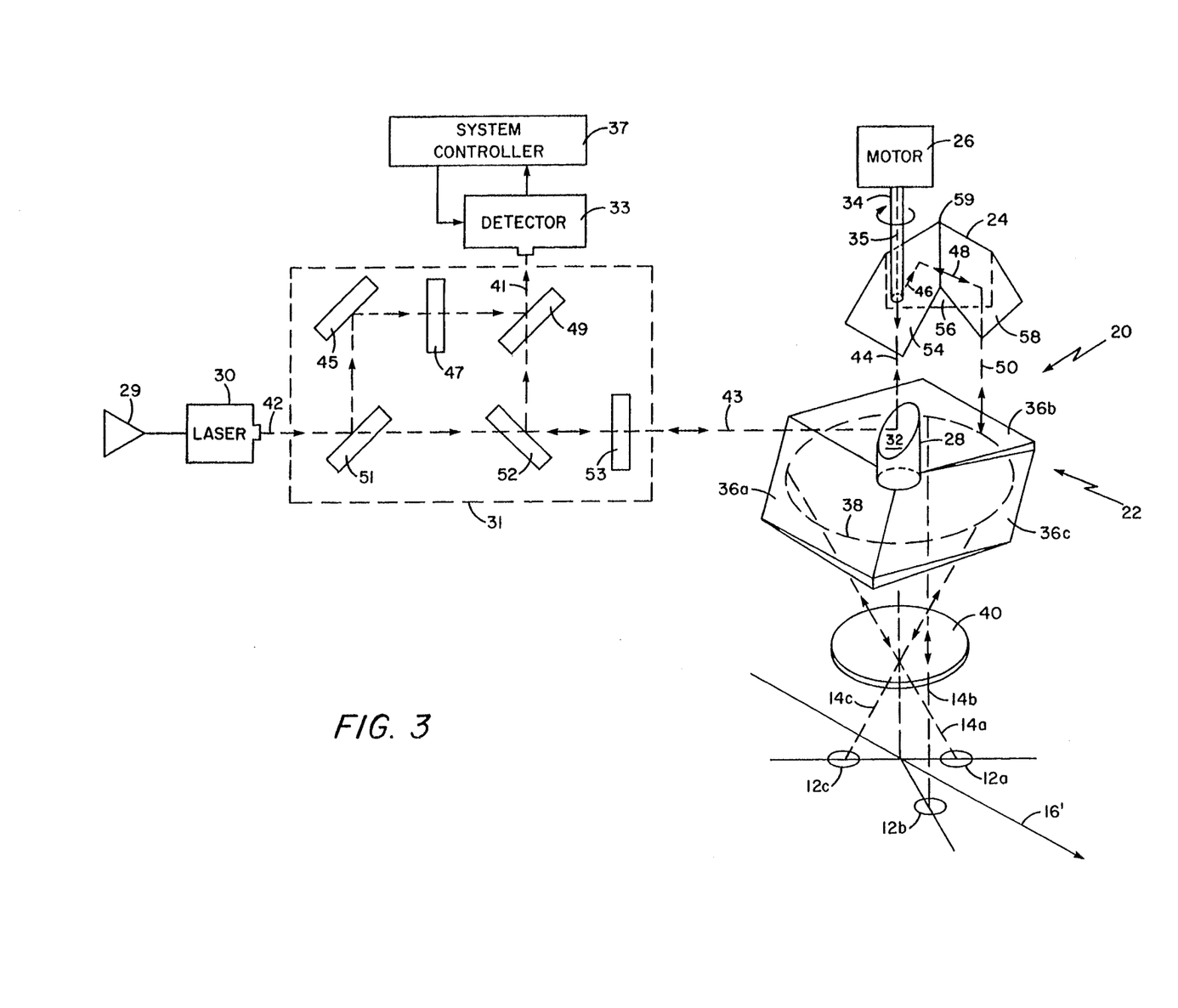
FIG. 3 illustrates an optical beam switch according to the present invention.

Referring now to FIG. 3, there is shown an optical beam switch 20 according to the present invention. Optical beam switch 20 comprises a fixed, multi-faceted light beam refracting device 22', a rotatable retroreflector 24, drive means 26 for rotating retroreflector 24, and a plane reflector 28 mounted to a fixed refracting device 22 for reflecting light provided from light source 30.

In the figures and the accompanying text, light beams will be represented only by their principal rays. It will be understood, however, that each beam has a finite cross-section, and that each optical element is of sufficient area to provide a uniform effect on the entire cross-sectional area of the beam.

Light source 30, which may typically comprise a carbon dioxide laser, emits a collimated beam of continuous wave coherent light 42 which passes through interferometer 31 onto plane reflecting surface 32 of reflector 28. Driver 29, coupled to laser 30, may illustratively modulate light beam 42 according to linear triangular frequency modulation, or frequency chirping. Interferometer 31 comprises a plurality of optical elements which combine a local oscillator with the beam reflected from the target and direct the combined beam into detector 33. More particularly, interferometer 31 comprises beam splitters 49 and 51, polarizing beam splitter 52, plane mirror 45, half-wave plate 47 and quarter-wave plate 53. In operation, beam 42 is incident on beam splitter 51 which reflects a small portion of the incoming beam toward mirror 45 and which transmits the greater portion toward beam splitter 52. The beam directed toward mirror 45 is reflected therefrom and passes through half-wave plate where its polarization is rotated by 90 degrees. This beam, which comprises the local oscillator beam, is then incident on beam splitter 49.

The portion of beam 42 which passes through beam splitter 51 has polarization which permits it to pass through polarizing beam splitter 52. It continues through quarter-wave plate 53, which converts its polarization from linear to circular. This beam passes out of interferometer 31 as beam 43. Reflecting surface 32 is illustratively positioned such that it reflects incoming beam 43 to a beam 44 directed away from and substantially normal to refracting device 22. As shown in FIG. 3, wherein beam 43 is substantially parallel to device 22, reflecting surface 32 is biased at 45 degrees in order to provide the proper reflection path for beam 43.

Figure 5A:
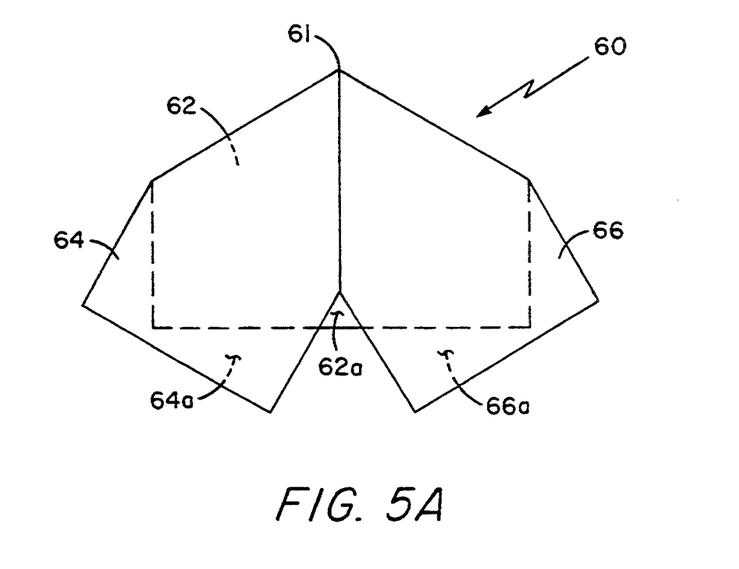
FIGS. 5A and 5B provide two views of a first embodiment of the retroreflector of the apparatus of FIG. 3.
Figure 5B:
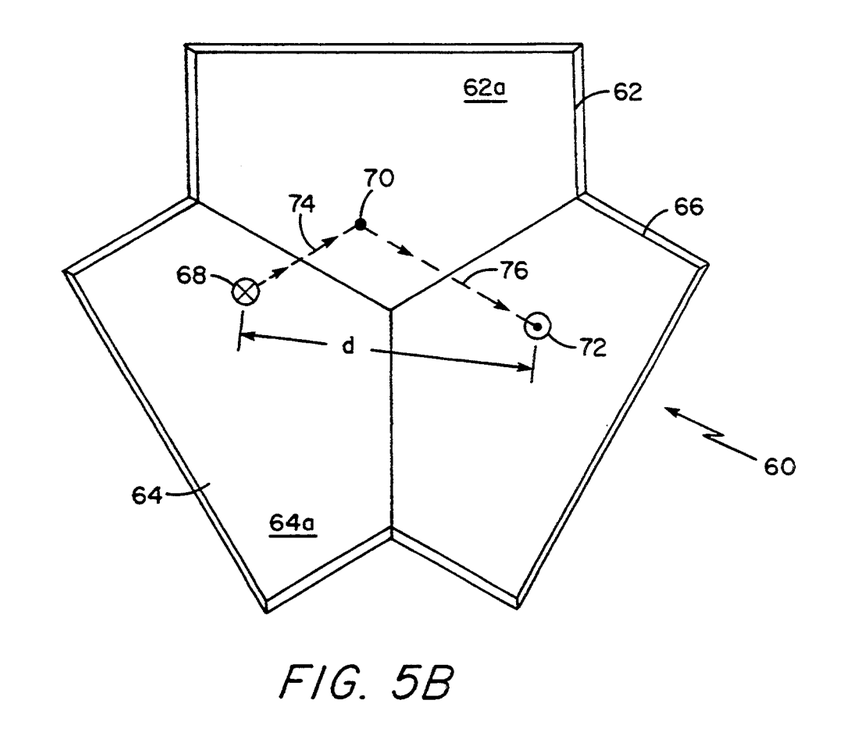
Figure 6:
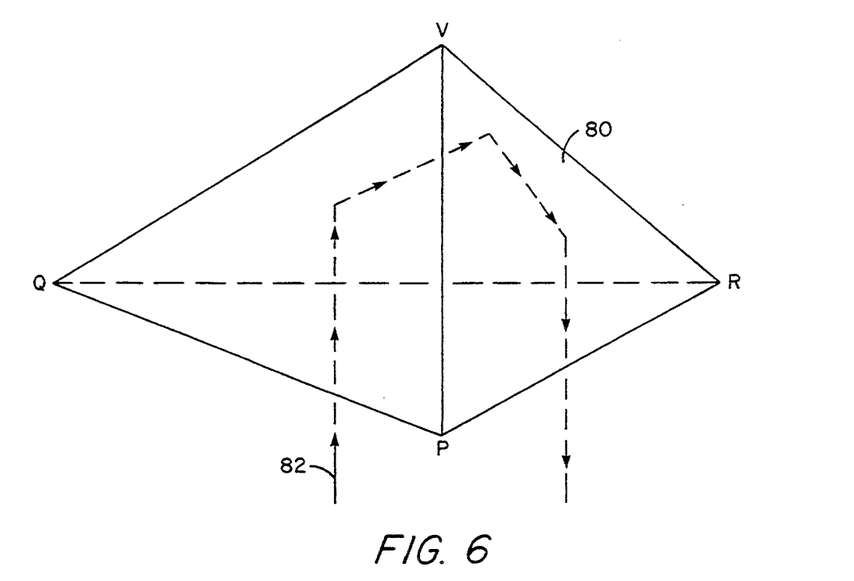
FIG. 6 illustrates a second embodiment of the retroreflector.

Light beam 44, reflected from surface 32, is directed into retroreflector 24. In the FIG. 3 embodiment, retroreflector 24 comprises three plane mirrors 54, 56 and 58 jointed at vertex 59 in such a fashion that light beam 44 is reflected from the mirrored inner surface of mirror 54 as light beam 46. Beam 46 is reflected from the mirrored inner surface of mirror 56 as light beam 48 onto the mirrored inner surface of mirror 58 which reflects it as beam 50. An important property of retroreflector 24, which is described in greater detail in the discussions of FIGS. 5A, 5B and 6, is the parallel relation between input beam 44 and output beam 50. More particularly, for an input beam 44 directed into retroreflector 24 other than toward vertex 59, the resulting output beam 50 will be parallel to and laterally displaced from input beam 44.

Drive motor 26 is coupled to retroreflector 24 via shaft 34, which rotates in the direction shown by the arrow. Shaft 34 is positioned such that its central axis 35 is coaxial with input beam 44. Thus, it is seen that the rotation of retroreflector 24 produces a sequence of beams 50 which may describe a circular path 38 on the upper surface of refracting device 22. Motor 26 rotates retroreflector 24 typically at a speed of 1260 revolutions per minute.

Beam 50, reflected from retroreflector 24, impinges on the upper surface of fixed, multi-faceted, light beam refracting device 22. In the FIG. 3 embodiment, device 22 comprises three prisms 36a, 36b and 36c, whose angulation provides refraction of beam 50 so as to illuminate spots 12a, 12b and 12c, respectively. A more detailed description of a typical prism comprising device 22 will be found in subsequent text accompanying FIG. 7.

The angulation of prism 36a is such that for the period of beam 50 traversing the arc of circle 38 on the upper surface of prism 36a, the beam is deflected as 14a at a constant depression angle and provides illumination at a substantially fixed angular position, with respect to vector 16', shown as illuminated spot 12a. Similarly, the angulation of prisms 36b and 36c are such that for the period of beam 50 traversing the arcs of circle 38 on the upper surfaces of those prisms, the beam is deflected as beams 14b and 14c, respectively, and provides at constant depression angles illumination at substantially fixed angular positions, with respect to vector 16', shown as illuminated spots 12b and 12c respectively.

Illuminated spots 12a–12c reflect the incident light back as return beams 14a–14c, respectively, and the reflected light continues as beams 50, 48, 46, 44 and 43, where it passes through quarter-wave plate 53 of interferometer 31. Beam 43, which was converted from linear to circular polarization by its first excursion through plate 53, is converted from circular polarization to orthogonal linear polarization during its return trip. Thus, the return beam which is incident on polarizing beam splitter 52 is rotated in polarization by 90 degrees from the beam 42 emitted from laser 30 which passed through beam splitter 52. The polarization of the return beam causes it to reflect from beam splitter 52, where it passes through beam splitter 49 and is combined with the local oscillator beam (having the same polarization). The combined beam 41 passes out of interferometer 31 into light-sensitive detector 33. Detector 33 converts the optical signal on beam 41 to a corresponding electrical signal applied to the system controller 37, which is typically a signal processor. Controller 37 typically computes Doppler velocity, position and range from the signal from detector 33.

Beams 14a–14c pass through the outer skin of aircraft 10 (see FIG. 1) via window 40. In order to minimize the area of window 40, it is advantageous to position refracting device 22 such that the effective waist formed by the combined beams 14a–14c occurs at or near window 40.

Although not explicitly shown, it is understood that there are provided support means for rigidly supporting light source 30, interferometer 31, detector 33, refracting device 22 (including plane reflector 28), drive means 26 and window 40.

Figure 4A:
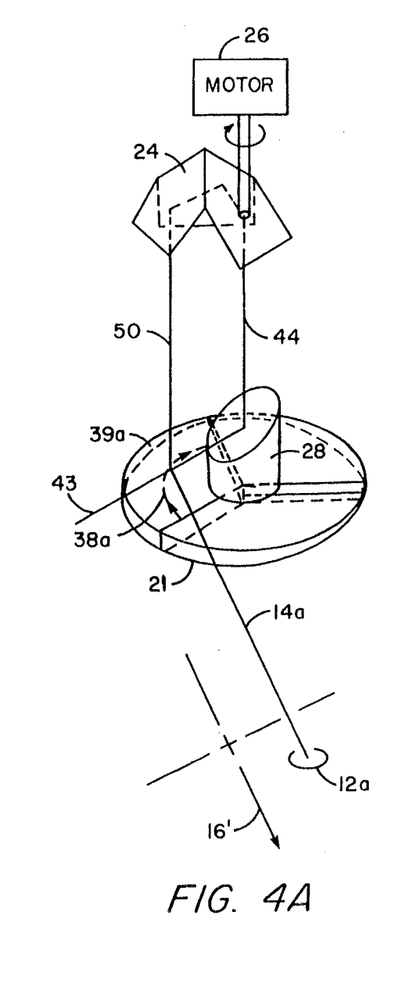
FIGS. 4A through 4C illustrate the apparatus of FIG. 3 in three operational phases.
Figure 4B:
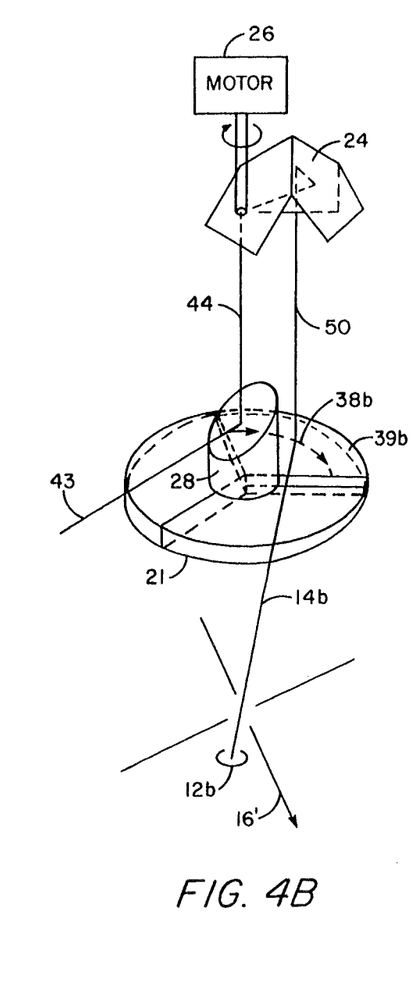
Figure 4C:
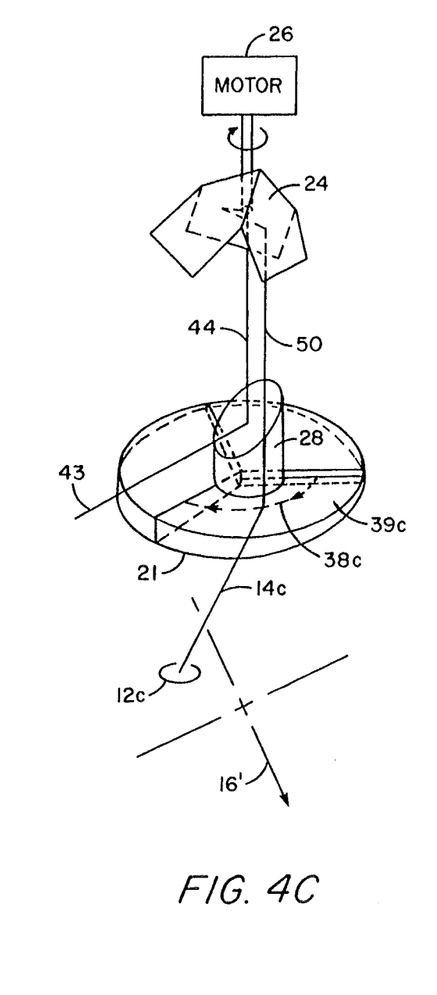

FIGS. 4A, 4B and 4C illustrate three operational phases of the apparatus of FIG. 3. These figures depict beam refracting device 21 as having circular upper and lower surfaces. In order to achieve this shape, the beam refracting device 22 of FIG. 3 may be modified merely by smoothing the corners of the three rhombic surfaces comprising prisms 36a–36c. It is easily seen, however, that such modification need not affect the optical properties of prisms 36a–36c along path 38 where beam 50 is impingent. Thus, the difference in shape between refracting device 22 of FIG. 3 and refracting device 21 of FIGS. 4A–4C is of no consequence to an understanding of the principles of the present invention.

Referring first to FIG. 4A, retroreflector 24 is positioned such that incoming beam 44 is displaced by the reflections within retroreflector 24 to to beam 50 (parallel to beam 44), which impinges on prism 39a. Prism 39a deflects beam 50 to become beam 14a which illuminates ground spot 12a. As beam 50 moves across the top surface of prism 39a along arc 38a in the direction shown, the deflection properties of prism 39a, as seen by beam 50, remain the same regardless of beam position on prism 39a, thereby maintaining beam 14a at a fixed depression angle for the entire sweep of beam 50 along arc 38a.

Referring now to FIG. 4B, retroreflector 24 has been rotated from its position in FIG. 4A in the direction shown by the arrows to a position such that incoming beam 44 is displaced to beam 50 impinging on prism 39b. Prism 39b deflects beam 50 to become beam 14b which illuminates ground spot 12b. As beam 50 moves across the top surface of prism 39b along arc 38b in the direction shown, the deflection properties of prism 39b, as seen by beam 50, remain the same regardless of beam position on prism 39b, thereby maintaining beam 14b at a fixed depression angle for the entire sweep of beam 50 along arc 38b.

Finally considering FIG. 4C, retroreflector 24 has been rotated from its previous position in the direction shown by the arrow to a position such that incoming beam 44 is displaced to beam 50 impinging on prism 39c. Prism 39c deflects beam 50 to become beam 14c which illuminates ground spot 12c. As beam 50 moves across the top surface of prism 39c along arc 38c in the direction shown, the deflection properties of prism 39c, as seen by beam 50, remain the same regardless of beam position on prism 39c, thereby maintaining beam 14c at a fixed depression angle for the entire sweep of beam 50 along arc 38c.

As was noted earlier, beam 50 has a finite cross section which, illustratively, may be 1.5 inches (3.8 cm). Furthermore, it is easily seen that as beam 50 crosses each of the boundaries between prisms 36a–36c, the refracted beam resulting therefrom will not necessarily provide adequate ground illumination at the required depression angle. For this reason, system controller 37 (see FIG. 3) may typically provide a gating signal to light signal detector 33 so that the light energy detected by detector 33 is converted to an electrical signal output to be sent to system controller 37 only when retroreflector 24 is positioned with respect to the light deflecting device 22 such that its output beam 50 is directed away from a boundary of prisms 36a–36c. By way of illustration, for the rotational speed of retroreflector 24 given earlier, the gating signal from controller 37 to detector 33 may be pulsed at a rate of 10 milliseconds on (enabling) and 5.87 milliseconds off (inhibiting).

A first embodiment of retroreflector 24 of FIG. 3 is shown in greater detail in FIGS. 5A and 5B. Retroreflector 60 comprises three mirrors 62, 64 and 66 having reflecting surfaces 62a, 64a and 66a, respectively. Each mirror 62–66 has a right angle corner, and retroreflector 60 is formed by cementing together the three mirrors 62–66 such that their right angled corners meet at vertex 61, and mirrored surfaces 62a–66a face inward.

Retroreflector 60 as described above has the quality that a light beam impingent on any of the three reflecting surfaces will reflect onto each of the two other reflecting surfaces and emerge parallel to the input beam. Furthermore, it is easily seen that for any input beam, the parallel output beam will be laterally displaced for every case except where the input beam is centered at vertex 61. Referring particularly to FIG. 5B, an input beam 68 is shown to impinge on surface 64a, reflects as beam 74 to point 70 on surface 62a, and reflects again as beam 76 to surface 66a, where it emerges as beam 72. Output beam 72 is parallel to input beam 68 and is laterally displaced from it by distance d.

Referring to FIG. 6, there is shown a second embodiment of a retroreflector 80 which may be of a type used as retroreflector 24 of FIG. 3. Retroreflector 80 comprises a glass prism having vertex V which is the intersection of three right angles, and having three equal base sides PQ, PR and QR. This type of prism is commonly referred to as a triple mirror and is made by cutting off the corner of a cube of optically transmissive material. The plane PQR formed by the cut makes equal angles with the three faces intersecting at that corner, that is, the angles formed between planes PQR and VPQ, between planes PQR and VQR, and between planes PQR and VPR are all equal. The optical properties of retroreflector 80 are well known and are described as a triple mirror in *Fundamentals of Optics*, 3rd ed., F. A. Jenkins and H. E. White, McGraw-Hill, 1957, at pages 16–17.

The triple mirror prism retroreflector 80 has the useful property that a light beam 82 striking it at surface PQR will, after internal reflections at each of the corner faces VPQ, VQR and VPR, be sent back parallel to its original direction. Total reflection from corner faces VPQ, VQR and VPR depends on the beam angle of incidence at those faces exceeding the critical angle for the boundary separating prism 80 and the air. For prism 80 fabricated of common crown glass, for example, the critical angle is 41.14 degrees for visible light. For a $CO_2$ laser with infrared radiation, zinc selenide or germanium may be used. Their critical angles are 24.62 degrees and 14.48 degrees, respectively. In the present example, in which light beam 82 is substantially perpendicular to surface PQR, with only minor deviations therefrom resulting from system perturbations, it may be easily shown that the angles of incidence of light beam 82 with each of the corner surfaces VPQ, VQR and VPR are always larger than the critical angle, and that system tolerances can be made to ensure that the incident angles are always substantially greater than the critical angle for the optical material of corner prism 80.

Figure 7:
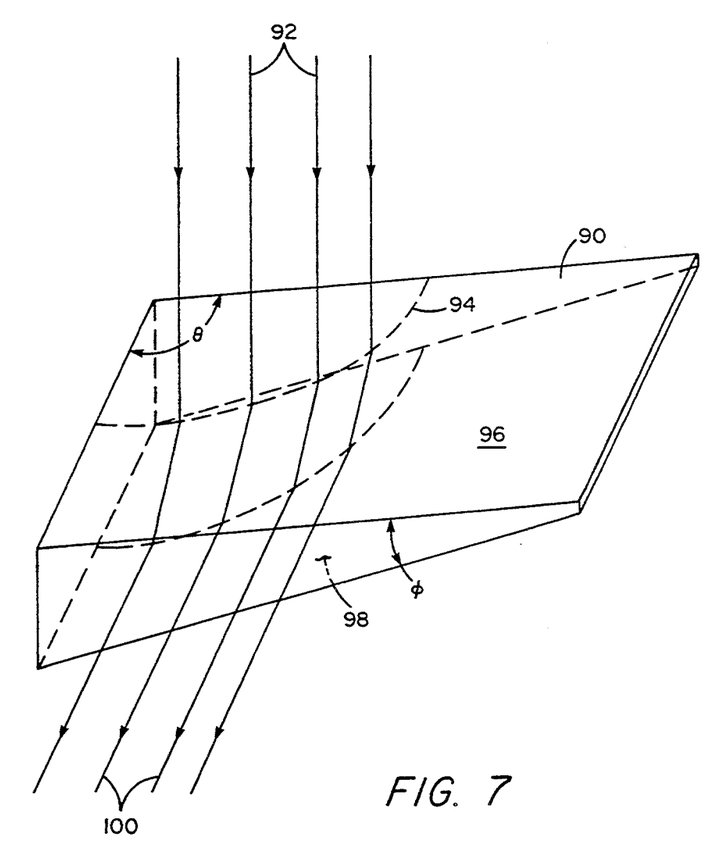
FIG. 7 illustrates a beam refracting prism of the type used in the FIG. 3 apparatus.

Referring to FIG. 7, there is shown a beam deflecting prism 90, which may be of a type similar to prism 36a of FIG. 3. Prism 90 is made from an optically transmissive material, and performs beam deflection by refraction. Prism 90 is shown as a wedge-shaped object having upper and lower surfaces formed as rhombuses. The larger angles $\theta$ of each rhombic surface are illustratively 120 degrees, suggesting a beam deflecting device comprising three prisms. This representation should be viewed as illustrative only, and not as a limitation on the invention which may comprise any number of prisms.

Light beam 92 impinges on surface 96 of prism 90. As beam 92 passes through prism 90, it is refracted according to the different indexes of refraction between air and the optical material of prism 90. As the light passes out of prism 90 at surface 98, it is refracted again and emerges as beam 100. In the preferred embodiment, prism 90 is positioned with respect to incoming beam 92 and outgoing beam 100 at minimum deviation. That is, the angle between incoming beam 92 and the normal to top surface 96 is equal to the angle between beam 100 and the normal to bottom surface 98. The depression angle is determined by angle $\phi$, the vertex angle. (In commom parlance, the prism is defined in terms of its "semivertex angle," which is $\phi/2$.) For a depression angle of 60 degrees, a prism fabricated of germanium may have a vertex angle of 9.76 degrees and a zinc selenide prism may have a vertex angle of 20.46 degrees. As incoming beam 92 is swept along arc 94 on surface 96, it emerges at a constant depression angle over the sweep of beam 92 across arc 94.

It is therefore easily seen that the optical beam switch described above provides ground spot illumination at a precisely repeatable depression angle, and at azimuthal angles which are substantially fixed. In fact, for the period that beam 92 sweeps across arc 94, the ground spot will "walk" a corresponding distance, approximately 2–3 inches in the above-described embodiment—a negligible distance in relation to the diameter of the illuminated ground spot.

From the foregoing description, it is seen that the optical beam switch of the present invention provides many advantages over the beam pointing and scanning systems of the prior art. Referring to beam pointer 20 in FIG. 3, the properties of retroreflector 24 are used to full advantage, particularly the property that the reflected beam 50 is always parallel to the incident beam 44, independent of the angles of incidence and reflection. Therefore, beam 50 traveling downward toward refracting prisms 36a, 36b and 36c remains parallel to itself as retroreflector 24 rotates in its assembly. Precise vertical alignment of the bearing assembly for retroreflector 24 and its drive motor 26 is not necessary. Bearing runout need not be maintained at tight tolerances, and bearing noise need not be minimized. The precision of the device inheres in the angular references within retroreflector 24 itself and not its translation in any of the three directions or rotation around any of the three axes. The temperature effects on the apparatus of the present invention are similar to those experienced by prior art apparatus. It is known that the index of refraction of optical materials varies with changes in temperature. Thus, temperature effects may be eliminated by maintaining a substantially constant operating temperature. Alternatively, temperature effects may be compensated for by measuring the temperature of the apparatus and providing the temperature information to a computational device in the system controller 37, which device may calculate the refraction angle based on the temperature information.

Another advantage of beam pointer 20 of the present invention is that a precision angular encoder is not necessary as it would be if, for example, a rotating wedge scanner were used. Beam pointer 20 maintains constant angular beam positioning to ground spots 12a, 12b and 12c as long as the downward going beam is on prisms 36a, 36b and 36c, respectively. It can be shown that the beam pointer 20 as disclosed herein may be used in a laser velocity measuring system to provide measurements within a few centimeters per second.

The angular accuracy of the azimuth direction of the three beams 14a, 14b and 14c is determined merely by the initial positioning of prisms 36a, 36b and 36c, respectively. Once these are rigidly mounted, there will be no relative motion among the prisms, and the azimuthal angles will be constant in time. The depression angles are determined by the indexes of refraction and the semivertex angles of prisms 36a, 36b and 36c. Either zinc selenide or germanium can be used for this purpose, and the illustrative depression angle of 60 degrees will be determined by the angles of the prisms themselves. Prisms 36a, 36b and 36c are typically positioned at or near minimum deviation of the refracted beam in order to relax the angular alignment tolerance at the initial positioning.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. An apparatus for sequentially illuminating a plurality of target surface locations from a light beam, said apparatus comprising:
   a deflection means including a plurality of light deflecting segments, each of said light deflecting segments deflecting said light beam toward a location on said target surface at a predetermined angle of incidence;
   means for directing said light beam sequentially to each of said plurality of light deflecting segments;
   said directing means includes a retroreflector responsive to an input light beam for providing an output light beam parallel to and laterally displaced from said input light beam; and
   means for rotating said retroreflector about an axis substantially coaxial with said input light beam.

2. The apparatus according to claim 1 wherein each of said light deflecting segments includes a prism.

3. The apparatus according to claim 2 wherein said directing means causes said light beam to describe a continuous path across incident surfaces of said plurality of prisms.

4. The apparatus according to claim 3 wherein said plurality of prisms is arranged such that said light beam is directed onto an incident surface of each of said plurality of prisms for a substantially equal time duration.

5. The apparatus according to claim 1 wherein said retroreflector comprises three reflecting surfaces.

6. The apparatus according to claim 1 wherein said retroreflector comprises a triple mirror prism.

7. The apparatus according to claim 6 wherein said input beam is incident on a boundary surface of said triple mirror prism at an angle which exceeds the critical angle for the material of said prism.

8. An apparatus for sequentially illuminating a plurality of target surface locations, said apparatus comprising:
   source means for generating a substantially collimated light beam;
   means for imparting motion to said collimated light beam;
   a deflection means including a plurality of light refracting segments, said deflection means being positioned so that said moving light beam sequentially impinges on an upper surface of each of said segments, each of said segments providing refraction of said light beam such that while said beam impinges said upper surface, said light beam, deflected by refraction, emerging from a lower surface thereof illuminates said target surface at a predetermined location and at a predetermined angle of incidence;
   said means for imparting motion to said collimated light beam includes a retroreflector responsive to an input light beam for providing an output light beam parallel to and laterally displaced from said input light beam; and
   means for rotating said retroreflector about and axis substantially coaxial with said input light beam.

9. The apparatus according to claim 8 wherein said source means comprises a carbon dioxide laser.

10. The apparatus according to claim 8 wherein said means for imparting motion to said collimated light beam further includes means for directing said collimated light beam from said source means onto said retroreflector.

11. The apparatus according to claim 8 wherein said retroreflector comprises three reflecting surfaces.

12. The apparatus according to claim 8 wherein said retroreflector comprises a triple mirror prism.

13. The apparatus according to claim 12 wherein said input beam is incident on a boundary surface of said triple mirror prism at an angle which exceeds the critical angle for the material of said prism.

14. The apparatus according to claim 8 wherein each of said plurality of light refracting segments comprises a prism.

15. The apparatus according to claim 14 wherein the angles of incidence of said deflected light beam with said target surface are determined by the vertex angles of said prisms and by the indexes of refraction of the optical materials comprising said prisms.

16. The apparatus according to claim 14 wherein said means for imparting motion to said light beam causes said light beam to describe a continuous path across the upper surface of said deflection means.

17. The apparatus according to claim 16 wherein said continuous path is substantially a circle.

18. The apparatus according to claim 17 wherein said plurality of prisms is arranged such that said light beam is directed at an incident surface of each of said plurality of prisms for a substantially equal time duration.

19. A laser system comprising:
   source means for generating a substantially collimated light beam;
   means for imparting motion to said collimated light beam;
   a deflecting means including a plurality of light refracting segments, said deflecting means being positioned so that said moving light beam sequentially impinges on an upper surface of each of said segments, each of said segments providing refraction of said light beam such that while said beam impinges on said upper surface, said light beam, deflected by refraction, emerging from a lower surface thereof illuminates a target surface at a predetermined location and at a predetermined angle of incidence;
   means for detecting illumination reflected from said target surface and for generating an electrical signal indicative thereof;
   control means responsive to said electrical signal for determining the Doppler velocity of said target surface;
   said means for imparting motion to said collimated light beam includes a retroreflector responsive to an input light beam for providing an output light beam parallel to and laterally displaced from said input light beam; and
   means for rotating said retroreflector about an axis substantially coaxial with said input light beam.

20. The system according to claim 19 wherein said source means comprises a continuous wave carbon dioxide laser.

21. The system according to claim 19 wherein the light output of said laser is modulated according to linear triangular frequency modulation.

22. The system according to claim 19 wherein said means for imparting motion to said collimated light beam further includes means for directing said collimated light beam from said source means onto said retroreflector.

23. The system according to claim 19 wherein said retroreflector comprises three reflecting surfaces.

24. The system according to claim 19 wherein said retroreflector comprises a triple mirror prism.

25. The system according to claim 24 wherein said input beam is incident on a boundary surface of said triple mirror prism at an angle which exceeds the critical angle for the material of said prism.

26. The system according to claim 19 wherein each of said plurality of light refracting segments comprises a prism.

27. The system according to claim 26 wherein the angles of incidence of said deflected light beam with said target surface are determined by the vertex angles of said prisms and by the indexes of refraction of the optical materials comprising said prisms.

28. The system according to claim 26 wherein said means for imparting motion to said light beam causes said light beam to describe a continuous path across the upper surface of said deflecting means.

29. The system according to claim 28 wherein said continuous path is substantially a circle.

30. The system according to claim 29 wherein said plurality of prisms is arranged such that said light beam is directed at an incident surface of each of said plurality of prisms for a substantially equal time duration.

31. An apparatus for sequentially illuminating a plurality of locations on a target surface from a light beam, said apparatus comprising:

stationary deflection means including a plurality of light refraction segments; and rotatable means for directing said light beam sequentially to each of said plurality of light refraction segments;

each of said light refraction segments having angulation so as to deflect said light beam toward a location on said target surface at a predetermined angle of incidence.

* * * * *